US 9,207,819 B2

(12) United States Patent
Tsai et al.

(10) Patent No.: US 9,207,819 B2
(45) Date of Patent: Dec. 8, 2015

(54) TOUCH SENSING DISPLAY PANEL AND TOUCH SENSING LIQUID CRYSTAL DISPLAY PANEL

(71) Applicant: AU Optronics Corp., Hsin-Chu (TW)

(72) Inventors: Hsin-Li Tsai, Hsin-Chu (TW); Yu-Feng Chien, Hsin-Chu (TW); Tun-Chun Yang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 135 days.

(21) Appl. No.: 13/776,655

(22) Filed: Feb. 25, 2013

(65) Prior Publication Data

US 2013/0314625 A1 Nov. 28, 2013

(30) Foreign Application Priority Data

May 22, 2012 (TW) .............................. 101118154 A (51) Int. Cl.
*G02F 1/1333* (2006.01)
*G06F 3/044* (2006.01)

(52) U.S. Cl.
CPC ............ *G06F 3/044* (2013.01); *G02F 1/13338* (2013.01); *G06F 2203/04112* (2013.01)

(58) Field of Classification Search
CPC ................ G02F 1/13338; G06F 3/044; G06F 2203/04112
USPC ........... 349/12, 149, 153; 345/174; 178/18.06
See application file for complete search history.

(56) References Cited

U.S. PATENT DOCUMENTS

| | | | |
|---|---|---|---|
| 6,124,917 A * | 9/2000 | Fujioka et al. ................. 349/153 |
| 6,424,394 B1 * | 7/2002 | Morii ............................ 349/110 |
| 7,332,379 B2 | 2/2008 | Chen | |
| 2009/0102995 A1 * | 4/2009 | Kim et al. ........................ 349/40 |
| 2009/0310052 A1 * | 12/2009 | Huang et al. .................... 349/40 |
| 2010/0290166 A1 | 11/2010 | Lin | |
| 2010/0321311 A1 | 12/2010 | Chang | |
| 2011/0157084 A1 * | 6/2011 | Huang et al. .................. 345/174 |
| 2012/0127092 A1 * | 5/2012 | Lee ............................... 345/173 |
| 2013/0194196 A1 * | 8/2013 | Lai ............................... 345/173 |

FOREIGN PATENT DOCUMENTS

| | | |
|---|---|---|
| CN | 101655755 | 2/2010 |
| CN | 101819494 A | 9/2010 |
| CN | 101907965 | 12/2010 |
| TW | 201032111 | 9/2010 |
| TW | 201040615 | 11/2010 |

* cited by examiner

*Primary Examiner* — Michael Caley
(74) *Attorney, Agent, or Firm* — Winston Hsu; Scott Margo (57) ABSTRACT

A touch sensing display panel includes a first substrate, a second substrate, a touch sensing device, a patterned electrode layer, an insulating layer, and a sealant. The first substrate has a touch sensing region, and a sealant region surrounding the touch sensing region. The touch sensing device is disposed on an inner surface of the first substrate in the touch sensing region. The patterned electrode layer is disposed on the inner surface of the substrate in the sealant region, and the patterned electrode layer includes a plurality of connecting lines electrically connected to a touch sensing device, and an auxiliary electrode. The auxiliary electrode is not directly electrically connected to the connecting lines and the touch sensing device. The sealant is disposed between the first substrate and the second substrate in the sealant region, and at least one of the connecting lines and the auxiliary electrode overlap the sealant.

19 Claims, 9 Drawing Sheets

TOUCH SENSING DISPLAY PANEL AND TOUCH SENSING LIQUID CRYSTAL DISPLAY PANEL

BACKGROUND OF THE INVENTION

1. Field of the Invention

The present invention relates to a touch sensing display device and a touch sensing liquid crystal display device, and more particularly, to a touch sensing display device and a touch sensing liquid crystal display device with uniform display quality.

2. Description of the Prior Art

Because of the intelligent characteristics of human-computer interaction, touch sensing display panels have been widely applied to the external input interfaces of many instruments. In recent years, as the applications of electronic products have developed diversely, consumer electronics with the integration of touch sensing functions and display panels are commercialized a lot and have evolved flourishingly, for example, mobile phones, GPS navigator systems, tablet PCs, personal digital assistances (PDA), and laptop PCs.

Generally, a touch sensing display panel includes a display panel and a touch sensing panel. The touch sensing panel can be built in the display panel or affixed outside of the display panel. According to the different sensing technologies, the touch sensing panels may be distinguished into resistive touch sensing panels, capacitive touch sensing panels, optical touch sensing panels, acoustic touch sensing panels and electromagnetic touch sensing panels. With the advantage of fast response time, high reliability and great durability, the capacitive touch sensing panels are now prevailing among electronic products. According to differences in structure designs and manufacturing processes, the capacitive touch sensing display panels may be distinguished into out-cell type touch sensing display panels, on-cell type touch sensing display panels, and in-cell type touch sensing display panels. In the out-cell type capacitive touch sensing display panels, sensing strings are first produced on a transparent substrate, and the transparent substrate with the sensing strings is then affixed on the outer surface of the display panel. In the on-cell type capacitive touch sensing display panels, touch sensing devices are disposed directly outside of the display panel. In the in-cell type capacitive touch sensing display panels, the touch sensing device is disposed on an inner surface of the upper substrate or lower substrate of a display panel; moreover, connecting lines electrically connect the touch sensing device to a device outside the touch sensing device. Therefore, the in-cell type capacitive touch sensing display panels have the advantages of thin thickness, high transmission ratio, simple manufacturing process and high reliability, and have therefore become the main development objective in this field.

However, in the conventional in-cell type touch sensing display panels, the connecting lines, which electrically connect the touch sensing device to a device outside the touch sensing device, are not uniformly distributed on a periphery region of a color filter substrate; therefore, the thickness of films disposed on the inner surface in the periphery region of the color filter substrate varies a lot and is uneven. When the color filter substrate and an array substrate are affixed, a sealant covers on a portion of the connecting lines. Therefore, if the thickness of the films on the inner surface of the color filter substrate varies and is uneven, the thickness of the sealant disposed between the color filter substrate and the array substrate is not uniform, leading to uneven cell gaps of the liquid crystal layer. Moreover, as the connecting lines of the touch sensing device electrically contact the array substrate, since the thickness of the films on the inner surface of the color filter substrate is uneven, the connecting lines and the array substrate may contact poorly, thereby preventing the touch sensing device from working normally.

SUMMARY OF THE INVENTION

It is one of the objectives of the present invention to provide a touch sensing display panel and a touch sensing liquid crystal display panel to solve the problem of uneven thickness of films on the inner surface of the substrate described above, which leads to uneven cell gap of the display medium layer, such as the liquid crystal layer.

It is one of the objectives of the present invention to provide a touch sensing display panel and a touch sensing liquid crystal display panel to solve the problem of uneven thickness of films on the inner surface of the substrate described above, which leads to poor contact between an array substrate and connecting lines.

According to an embodiment, the present invention provides a touch sensing display panel, which includes a first substrate, a second substrate, a touch sensing device, a patterned electrode layer, an insulating layer and a sealant. The first substrate has an inner surface. The first substrate has a touch sensing region in which a sealant region surrounds the touch sensing region. The second substrate is disposed opposite to the first substrate and facing the inner surface of the first substrate. The touch sensing device is disposed on the inner surface of the first substrate in the touch sensing region. The patterned electrode layer is disposed on the inner surface of the first substrate in the sealant region. The patterned electrode layer includes a plurality of connecting lines and an auxiliary electrode. The connecting lines are electrically connected to the touch sensing device; the auxiliary electrode is not directly electrically connected to the connecting lines and the touch sensing device. The insulating layer is disposed on the inner surface of the first substrate and covers the touch sensing device and the patterned electrode layer. The sealant is disposed between the first substrate and the second substrate in the sealant region and is configured to combine the first substrate and the second substrate. The auxiliary electrode and at least one of the connecting lines overlap the sealant to be located between the sealant and the first substrate.

According to another embodiment, the present invention provides a touch sensing display panel, which includes a first substrate, a second substrate, a touch sensing device, a patterned electrode layer, an insulating layer, a sealant and a liquid crystal layer. The first substrate has an inner surface. The first substrate has a touch sensing region in which a sealant region surrounds the touch sensing region. The second substrate is disposed opposite to the first substrate and facing the inner surface of the first substrate. The touch sensing device is disposed on the inner surface of the first substrate in the touch sensing region. The patterned electrode layer is disposed on the inner surface of the first substrate in the sealant region. The patterned electrode layer includes a plurality of connecting lines and an auxiliary electrode. The connecting lines are electrically connected to the touch sensing device; the auxiliary electrode is not directly electrically connected to the connecting lines and the touch sensing device. The insulating layer is disposed on the inner surface of the first substrate and covers the touch sensing device and the patterned electrode layer. The sealant is disposed region between the first substrate and the second substrate in the sealant and is configured to combine the first substrate and the second substrate. The auxiliary electrode and at least one of the connecting lines overlap the sealant to be located between the sealant and the first substrate. The liquid crystal layer is disposed between the first substrate and the second substrate and the liquid crystal layer is surrounded by the sealant.

In the touch sensing display panel of the present invention, since the auxiliary electrode is disposed on the inner surface of the first substrate in the sealant region, the spacing between the connection pads overlapping the sealant and a periphery circuit overlapping the sealant is even. Therefore, the touch sensing display panel has an even cell gap in the liquid crystal layer and contacts between the connection pads and the periphery circuit are enhanced.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present disclosure, the embodiments will be described in detail. The embodiments of the present disclosure are illustrated in the accompanying drawings with numbered elements. In addition, the terms such as "first" and "second" described in the present disclosure are used to distinguish different components or processes, which do not limit the sequence of the components or processes.

Figure 1:
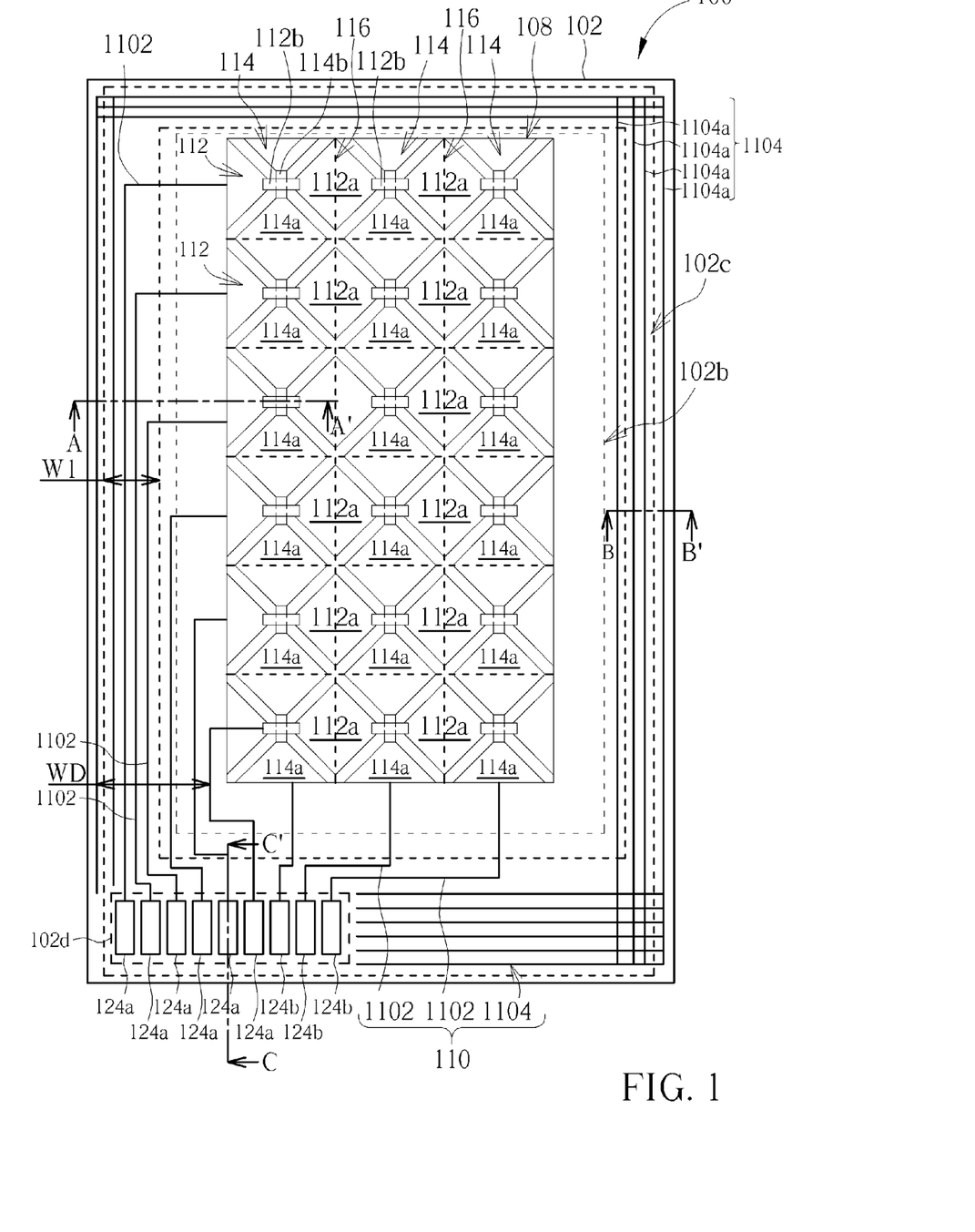
FIG. 1 is a schematic diagram illustrating a top view of a touch sensing display panel according to a first embodiment of the present invention.
Figure 2:
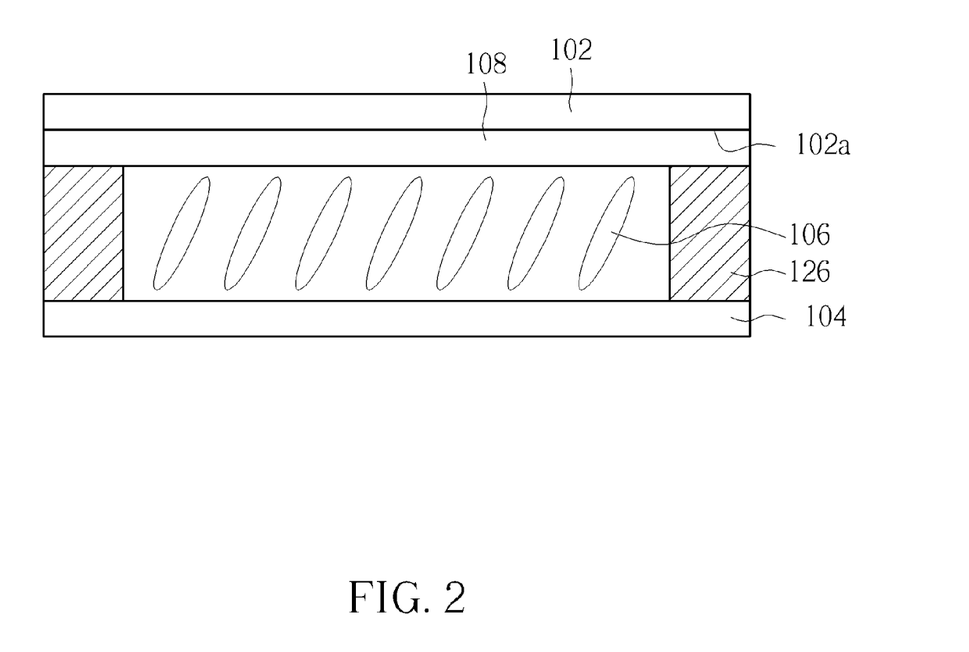
FIG. 2 is a schematic diagram illustrating a cross-sectional view of the touch sensing display panel in a touch sensing region according to the first embodiment of the present invention.

Please refer to FIGS. 1-2. FIG. 1 is a schematic diagram illustrating a top view of a touch sensing display panel according to a first embodiment of the present invention. FIG. 2 is a schematic diagram illustrating a cross-sectional view of the touch sensing display panel in a touch sensing region according to the first embodiment of the present invention. As shown in FIGS. 1-2, the touch sensing display panel 100 includes a first substrate 102, a second substrate 104, a display medium layer 106, a sealant 126, a touch sensing device 108, and a patterned electrode layer 110. The first substrate 102 has an inner surface 102a. The first substrate 102 is disposed opposite to the second substrate 104, and the second substrate 104 faces the inner surface 102a of the first substrate 102. The first substrate 102 has a touch sensing region 102b, a sealant region 102c, which surrounds the touch sensing region 102b. The first substrate 102 can optionally further include a buffer region and a connection region 102d. In this embodiment, the touch sensing region 102b serves as an area for a user or a touching device to touch. The sealant region 102c is configured for disposing the sealant 126, which combines the first substrate 102 and the second substrate 104. The buffer region may be optionally formed between the touch sensing region 102b and the sealant region 102c. The connection region 102d is configured for electrically connecting the touch sensing device 108 to periphery circuits disposed on the second substrate 104 (not shown in FIG. 1 and FIG. 2). Moreover, the connection region 102d may be disposed in the sealant region 102c, but not limited thereto. The connection region of the touch sensing display panel in the present invention may be selectively disposed between the touch sensing region and the sealant region or at an outer side of the sealant region. In a modified embodiment, the touch sensing device of the touch sensing display panel may be directly electrically connected to the outside from the first substrate, and does not have the connection region. The display medium layer 106 is disposed between the first substrate 102 and the second substrate 104 in the touch sensing region 102b. Therefore, the user may execute the touch sensing function in the touch sensing region 102b corresponding to the image displayed by the display medium layer 106. The touch sensing device 108 is disposed on the inner surface 102a of the first substrate 102 in the touch sensing region 102b and between the first substrate 102 and the display medium layer 106 in the touch sensing region 102b; the touch sensing device 108 is configured for detecting a position touched by the user. Accordingly, the touch sensing display panel 100 is preferably an in-cell touch sensing display panel. The type of the display panel of the touch sensing display panel 100 depends on the material of the display medium layer 106. In this embodiment, the display medium layer 106 may include a liquid crystal layer. Therefore, the touch sensing display panel 100 is a touch sensing liquid crystal display panel, but the present invention is not limited to this. Moreover, each of the first substrate 102 and the second substrate 104 may consist of a transparent substrate, for example, a glass substrate, a toughened glass substrate, a cover glass substrate, a quartz substrate, a sapphire substrate and a plastic substrate, but not limited thereto. In other embodiments of the present invention, the display medium layer 106 may include a liquid crystal layer, an organic electroluminescent layer, an inorganic electroluminescent layer, an electrophoretic display material layer, an electro-wetting display material layer, an electric dust display material layer, a plasma display material layer, or a field emission display material layer, but not limited thereto. A color filter layer and a black matrix layer may be disposed between the touch sensing device and the display medium layer, or disposed between the second substrate and the display medium layer according to different design requirements, but the present invention is not limited to this.

In this embodiment, the touch sensing device 108 is preferably a capacitive touch sensing display panel, for example, a projection type capacitive touch sensing device or a surface type capacitive touch sensing device. For example, a capacitive touch sensing device 108 may include a plurality of first sensing strings 112 parallel to each other and a plurality of second sensing strings 114 parallel to each other. Each of the first sensing strings 112 may include a plurality of first sensing pads 112a and a plurality of first bridge lines 112b. In each of the first sensing strings 112, each of the first bridge lines 112b connects two of the first sensing pads 112a adjacent to each other so as to electrically connect the first sensing pads 112a in each of the first sensing strings 112 to each other. Each of the second sensing strings 114 may include a plurality of second sensing pads 114a and a plurality of second bridge lines 114b. In each of the second sensing strings 114, each of the second bridge lines 114b connects two of the second sensing pads 114a adjacent to each other so as to electrically connect the second sensing pads 114a in each of the second sensing strings 114 to each other. Moreover, each of the first sensing strings 112 extends along a first direction (such as along the horizontal direction in FIG. 2). Each of the second sensing strings 114 extends along a second direction, perpendicular to the first direction (such as along the vertical direction in FIG. 2). Therefore, the first sensing strings 112 and the second sensing strings 114 are intersected to form a plurality of sensing units 116 arranged in an array. In the touch sensing mode, when the touch sensing signal is inputted, a touch coupling capacitance is formed between the user's fingers (or other input devices) and a portion of the corresponding first sensing pads 112a and a portion of the corresponding second sensing pads 114a, leading to a capacitance change. Thus, an effect of a signal difference required by a touch integrated circuit (touch IC) can be achieved and measured. In this embodiment, each of the sensing units 116 corresponds to each of the first sensing pads 112a and each of the second sensing pads 114a, respectively, but the present invention is not limited to this. Each of the sensing units 116 may correspond to a plurality of first sensing pads and a plurality of second sensing pads. The touch sensing device is well known by a person of ordinary skill in the art and not limited to the above description of arrangement and connection in the present invention.

Moreover, the patterned electrode layer 110 is disposed on the inner surface 102a of the first substrate 102 in the sealant region 102c and extends onto the inner surface 102a of the first substrate 102 in a region adjacent to the sealant region 102c. The patterned electrode layer 110 includes a plurality of connecting lines 1102 and an auxiliary electrode 1104. The connecting lines 1102 are electrically connected to the touch sensing device 108 so as to deliver the signal received by the touch sensing device 108. The auxiliary electrode 1104 is disposed on the inner surface 102a of the first substrate 102 in the sealant region 102c without the connecting lines 1102, and the auxiliary electrode 1104 is not directly electrically connected to the connecting lines 1102 and the touch sensing device 108. In this embodiment, the auxiliary electrode 1104 is disposed in the sealant region 102c at four sides of the touch sensing region 102b. The auxiliary electrode 1104 can be in a constant potential voltage, a floating state or electrically connected to ground, but not limited thereto. One end of each of the connecting lines 1102 is connected to one end of each of the first sensing strings 112 and one end of each of the second sensing strings 114, respectively so that each of the connecting lines 1102 can be electrically connected to each of the first sensing strings 112 and each of the second sensing strings 114 respectively. The connecting lines 1102 may extend into the sealant region 102c along the two sides of the touch sensing region 102b and pass through the connection region 102d selectively. The connecting lines 1102 are disposed between the auxiliary electrode 1104 and the touch sensing device 108. It should be noted that the connecting lines 1102 are only formed on a portion of the touch sensing region 102b, for example, the two sides of the touch sensing region 102b. Thus, the auxiliary electrode 1104 is disposed on the inner surface 102a of the first substrate 102 in the sealant region 102c without the connecting lines 1102 so that the thickness of the films on the inner surface 102a of the first substrate 102 in the sealant region 102c is more uniform comparing to no auxiliary electrode 1104. In other words, in this embodiment, the auxiliary electrode 1104 is disposed in the sealant region 102c at the other two sides of the touch sensing region 102b, and the auxiliary electrode 1104 is also disposed in the sealant region 102c outside the connecting lines 1102 at the two sides of the touch sensing region 102b. Therefore, when the first substrate 102 and the second substrate 104 are combined with the sealant 126, since the thickness of the films on the inner surface 102a of the first substrate 102 in the sealant region 102c is uniform, the gap between the upper surface of the films on the inner surface 102a of the first substrate 102 in the sealant region 102c and the upper surface of the periphery circuit 130a on the second substrate 104 can be uniform. Accordingly, the thickness of the display medium layer 106 disposed between the first substrate 102 and the second substrate 104 can be uniform. The touch sensing display panel 100 displays more uniform display images, and thus a problem of Gap Moiré phenomenon, owing to uneven gaps, is reduced. Moreover, since the gap between the first substrate 102 and the second substrate 104 is even, the sealant 126 can uniformly contact the films on the inner surface 102a of the first substrate 102 and the periphery circuit 130a on the second substrate 104. In other embodiments of the present invention, the auxiliary electrode 1104 may be disposed at at least one side of the touch sensing region.

Figure 3:
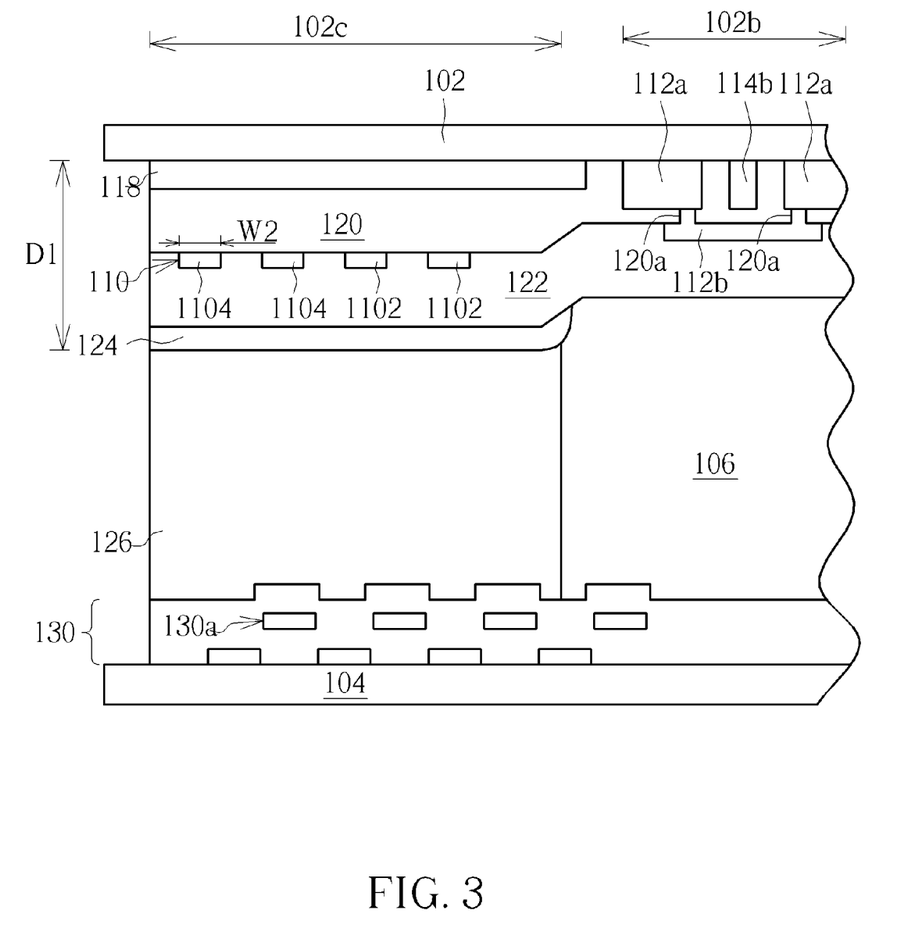
FIG. 3 is a cross-sectional view diagram taken along a cross-sectional line A-A' in FIG. 2.
Figure 4:
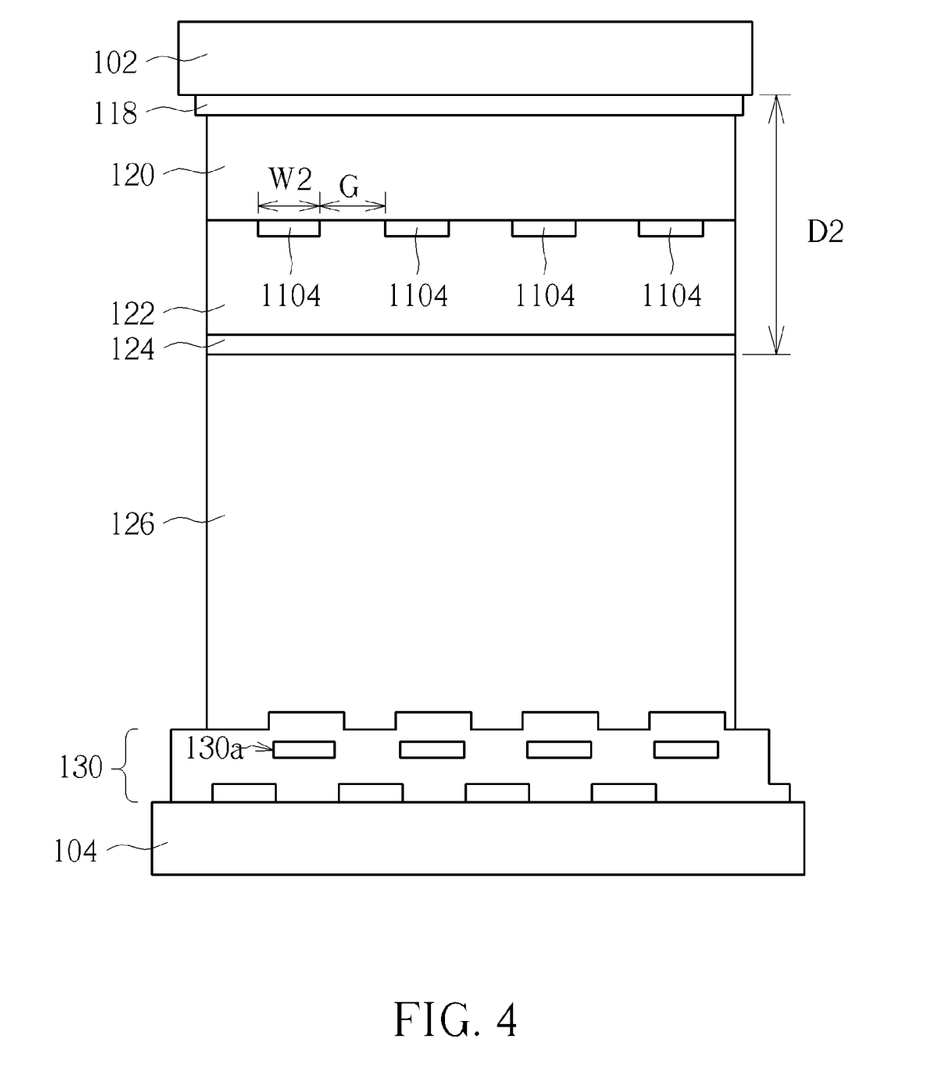
FIG. 4 is a cross-sectional view diagram taken along a cross-sectional line B-B' in FIG. 2.
Figure 5:
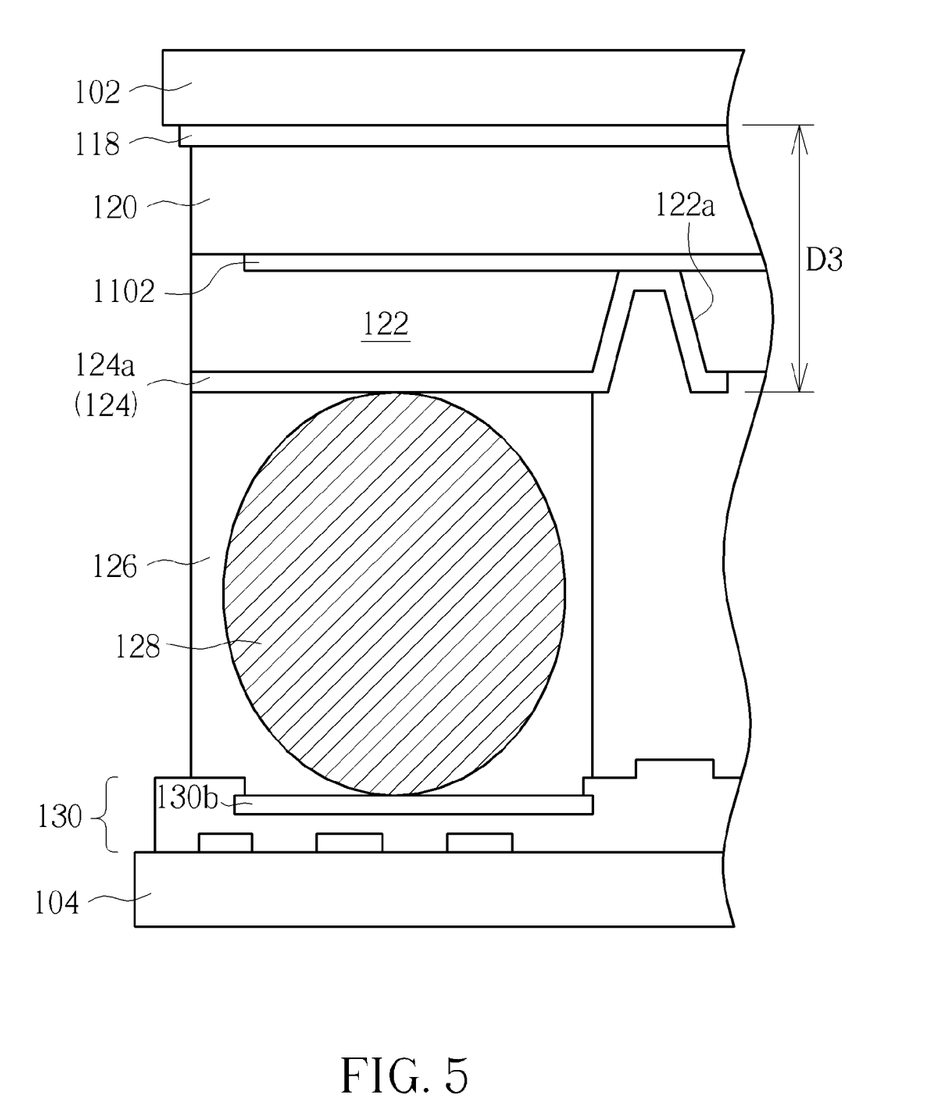
FIG. 5 is a cross-sectional view diagram taken along a cross-sectional line C-C' in FIG. 2.

Please refer to FIGS. 3-5, and also refer to FIG. 2. FIG. 3 is a cross-sectional view diagram taken along a cross-sectional line A-A' in FIG. 2. FIG. 4 is a cross-sectional view diagram taken along a cross-sectional line B-B' in FIG. 2. FIG. 5 is a cross-sectional view diagram taken along a cross-sectional line C-C' in FIG. 2. As shown in FIGS. 2-5, the touch sensing display panel 100 further includes a first insulating layer 120, a second insulating layer 122, a patterned conductive layer 124, a sealant 126, a plurality of conductive structures 128 and an array circuit layer 130. A patterned light-shielding layer 118 may be disposed on the inner surface 102a of the first substrate 102 outside the touch sensing region 102b in the touch sensing display panel 100 so as to cover circuit components outside the touch sensing region 102b. Moreover, the first sensing pads 112a, the second sensing pads 114a, and the second bridge lines 114b are disposed on the inner surface 102a of the first substrate 102 in the touch sensing region 102b. The first sensing pads 112a, the second sensing pads 114a, and the second bridge lines 114b can be made of the same transparent conductive layer 132, such as indium zinc oxide or indium tin oxide, but the present invention is not limited to this. The first sensing pads, the second sensing pads, and the second bridge lines of the present invention may be formed of a mesh metal layer or a laminated layer of a transparent conductive layer and a metal layer, but not limited thereto. The first insulating layer 120 may cover the patterned light-shielding layer 118, the transparent conductive layer 132 and the inner surface 102a of the first substrate 102. The first insulating layer 120 may include a plurality of first through holes 120a, corresponding to two sides of each of the first sensing pads 112a. The patterned electrode layer 110 and the first bridge lines 112b may be disposed on the first insulating layer 120. Each of the first bridge lines 112b may be filled into two of the first through holes 120a corresponding to two of the first sensing pads 112a adjacent to each other so as to electrically connect the two first sensing pads 112a adjacent to each other, and each of the first bridge lines 112b crosses each of the second bridge lines 114b. The first bridge lines 112b and the patterned electrode layer 110 can be made of the same material conductive layer, for example, a metal layer, a transparent conductive material layer or a laminated layer of a transparent conductive layer and a metal layer thereon, but not limited thereto. The second insulating layer 122 may cover the patterned electrode layer 110, the first insulating layer 120 and the first bridge lines 112b. The patterned conductive layer 124 may be selectively disposed on the second insulating layer 122. The patterned conductive layer 124 includes a plurality of connection pads 124a and 124b, which are disposed in the connection region 102d. The connection pads 124a and 124b may be divided into first connection pads 124a and second connection pads 124b. The second insulating layer 122 has a plurality of second through holes 122a near the connection region 102d. Each of the first connection pads 124a and each of the second connection pads 124b of the patterned conductive layer 124 respectively extend into each of the second through holes 122a so as to contact each of the connecting lines 1102 through each of the second through holes 122a respectively; therefore, each of the first connection pads 124a and each of the second connection pads 124b are electrically connected to the other end of each of the connecting lines 1102 respectively. Accordingly, each of the first sensing strings 112 may be electrically connected to each of the first connection pads 124a, and each of the second sensing strings 114 may be electrically connected to each of the second connection pads 124b. In this embodiment, the patterned conductive layer 124 may be formed of metal, transparent conductive materials or a laminated layer of a transparent conductive layer and a metal layer thereon; the transparent conductive materials may be, for example, indium zinc oxide or indium tin oxide, but not limited thereto. In other embodiments of the present invention, the common electrode (not shown) may be disposed selectively on the second insulating layer in the touch sensing region, and the common electrode (not shown) in the touch sensing region and the patterned conductive layer may be made of the same material layer, for example, indium zinc oxide or indium tin oxide, but not limited thereto. In a modified embodiment, the common electrode and the patterned conductive layer may be formed of different conductive material layers. In a further embodiment, the touch sensing display panel has no common electrode. The transparent conductive layer, including the first sensing pads, the second sensing pads and the second bridge lines, may be changed with the first bridge lines; in other words, the patterned electrode layer and the first bridge lines are disposed between the first insulating layer and the first substrate, and the transparent conductive layer is disposed between the first insulating layer and the second insulating layer, but not limited thereto. The first sensing strings and the second sensing strings may be formed of the conductive material layer at two sides thereof, and the patterned electrode layer may be formed of the same material layer as one of the first sensing strings and the second sensing strings.

The sealant 126 is disposed between the second insulating layer 122 of the first substrate 102 and the second substrate 104 in the sealant region 102c. The sealant 126 surrounds the display medium layer 106, and is configured to combine the first substrate 102 and the second substrate 104 together. The conductive structures 128 may be disposed in the sealant 126. In this embodiment, the conductive structures 128 may be a conductive bar, a conductive columnar, a conductive photo spacer or conductive particles, for example, Au ball conductive particles, which are spread in the sealant 126 of the connection region 102d, but not limited thereto. The conductive structures 128 may be replaced by a conductive columnar or a conductive photo spacer, for example, a photo spacer covered by conductive materials. The array circuit layer 130 is disposed on the surface of the second substrate 104, facing the first substrate 102. The array circuit layer 130 includes a periphery circuit 130a and a plurality of contact pads 130b, disposed between the second substrate 104 and the sealant 126, for example. Since the conductive structures 128 are disposed in the sealant 126, the conductive structures 128 may contact each of the connection pads 124a and 124b and the contact pads 130b respectively. The conductive structures 128 may thus be electrically connected to each of the connection pads 124a, 124b and the contact pads 130b, and further electrically connected each of the first sensing strings 112 and each of the second sensing strings 114 to the external control components. In other embodiments of the present invention, each of the connection pads may be disposed outside the sealant region and electrically connected to a flexible printed circuit board (FPC) by contacting an anisotropic conduction film (ACF). Each of the connection pads thus further electrically connects each of the first sensing strings and each of the second sensing strings to the external control components. The touch sensing display panel may not include the patterned conductive layer and the connection pads and the connecting lines directly electrically connect each of the first sensing strings and each of the second sensing strings to the external control components.

It is worth noting that at least one of the connecting lines 1102 and the auxiliary electrode 1104 overlap the sealant 126 respectively, and are disposed between the sealant 126 and the first substrate 102. Therefore, the films on the inner surface 102a of the first substrate 102 in the sealant region 102c at two sides of the touch sensing region 102b are formed of a stack of the patterned light-shielding layer 118, the first insulating layer 120, the connecting lines 1102, the second insulating layer 122 and the patterned conductive layer 124. The films on the inner surface 102a of the first substrate 102 in the sealant region 102c at two sides of the touch sensing region 102b have a first thickness D1 as shown in FIG. 3. The films on the inner surface 102a of the first substrate 102 in the sealant region 102c at the other two sides of the touch sensing region 102b are formed of a stack of the patterned shading layer 118, the first insulating layer 120, the auxiliary electrode 1104, the second insulating layer 122 and the patterned conductive layer 124. The films on the inner surface 102a of the first substrate 102 in the sealant region 102c at the other two sides of the touch sensing region 102b have a second thickness D2 as shown in FIG. 4. Accordingly, the auxiliary electrode 1104 is disposed on the inner surface 102a of the first substrate 102 in the sealant region 102c at the other two sides of the touch sensing region 102b. The auxiliary electrode 1104 and the connecting lines 1102 are formed of the same patterned electrode layer; therefore, the first thickness D1 and the second thickness D2 are substantially the same. When the first substrate 102 and the second substrate 104 are combined, the gap between the patterned conductive layer 124 of the sealant region 102c and the surface of the periphery circuit 130a of the second substrate 104 may then be more even. The sealant 126 may thus contact both the patterned conductive layer 124 in the sealant region 102c with the connecting lines 1102 and the patterned conductive layer 124 in the sealant region 102c without the connecting lines 1102 uniformly. The uneven gap in the display medium layer 106 between the first substrate 102 and the second substrate 104, which affects the display quality, can thus be avoided. As shown in FIG. 5, the patterned light-shielding layer 118, the first insulating layer 120, the connecting lines 1102, the second insulating layer 122 and the connection pads 124a of the patterned conductive layer 124 are also disposed on the inner surface 102a of the first substrate 102 in the connection region 102d. Therefore, the films on the inner surface 102a of the first substrate 102 in the connection region 102d have a third thickness D3, which is substantially equal to the first thickness D1 and the second thickness D2. Accordingly, the conductive structures 128 in the sealant 126 may uniformly contact each of the connection pads 124a and 124b and the contact pads 130b on the second substrate 104 so as to avoid poor contact between the connection pads 124a and the contact pads 130b on the second substrate 104.

In this embodiment, the patterned electrode layer 110 overlaps the sealant 126 along a vertical direction, which is the direction perpendicular to the display panel of the touch sensing display panel 100. An overlapping area of the patterned electrode layer 110 and the sealant 126 is substantially in a range comprised between 30% and 99% of an area of the sealant 126. Accordingly, the uneven level of the surface of the patterned conductive layer 124 on the patterned electrode layer 110 in the sealant region 102c may be avoided from being too large. The sealant 126 has a first width W1 along vertical direction. The connecting lines 1102 and the auxiliary electrode 1104 have a distribution width WD along the vertical direction. The distribution width WD is greater than or equal to the first width W1. The first width W1 is preferably in a range comprised between 250 μm and 2000 μm, but not limited thereto. The auxiliary electrode 1104 includes a plurality of auxiliary electrode lines 1104a. Each of the auxiliary electrode lines 1104a has a second width W2, and the second width W2 is preferably in a range comprised between 1 μm and 100 μm. Any two of the auxiliary electrode lines 1104a adjacent to each other are spaced apart with a gap G in a range comprised between 1 μm and 100 μm.

The touch sensing display panel of the present invention is not limited to the above-mentioned embodiments. The following description will detail the different embodiments of the touch sensing display panel in the present invention. To simplify the description and show the differences among the embodiments, identical components are marked with identical symbols, and the identical features will not be redundantly described in the following description.

Figure 6:
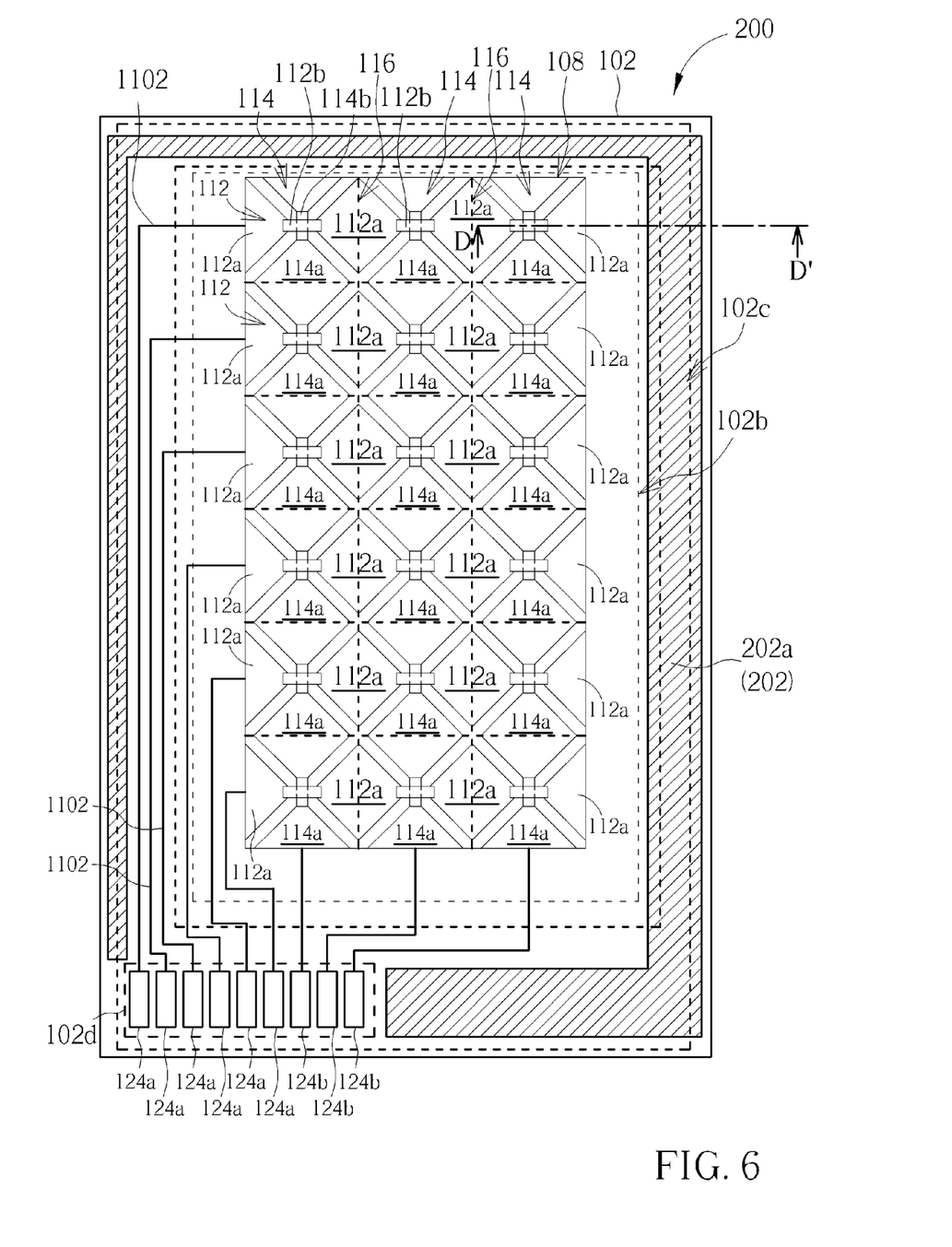
FIG. 6 is a schematic diagram illustrating a top view of a touch sensing display panel according to a second embodiment of the present invention.
Figure 7:
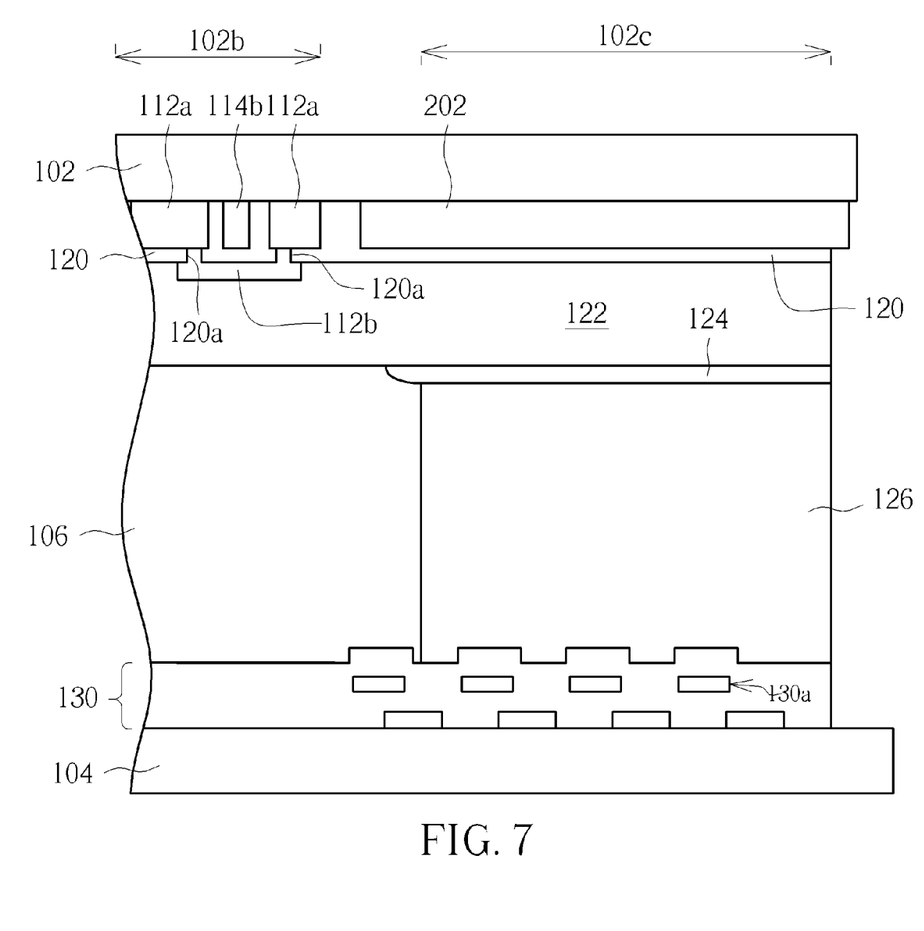
FIG. 7 is a cross-sectional view diagram taken along a cross-sectional line D-D' in FIG. 6.

Please refer to FIGS. 6-7. FIG. 6 is a schematic diagram illustrating a top view of a touch sensing display panel according to a second embodiment of the present invention. FIG. 7 is a cross-sectional view diagram taken along a cross-sectional line D-D' in FIG. 6. As shown in FIGS. 6-7, as compared with the first embodiment, the auxiliary electrode 202 of the touch sensing display panel 200 in this embodiment may further include a patterned planar electrode 202a, disposed in the sealant region 102c at the two sides of the touch sensing region 102b without the connecting lines 1102. Therefore, the patterned conductive layer 124 corresponding to the patterned planar electrode 202a may have a smooth surface so as to contact the sealant 126 closely. In this embodiment, the first sensing pads 112a, the second sensing pads 114a and the second bridge lines 114b are formed of the same material layer, such as indium zinc oxide or indium tin oxide, but not limited thereto. The second bridge lines 114b and the patterned electrode layer 110 are formed of the same material layer, but not limited thereto. In other embodiments of the present invention, the auxiliary electrode in the sealant region may include at least one of a mesh electrode, a stripe auxiliary electrode and a patterned planar electrode. The first bridge lines may be changed with the conductive material layer including the first sensing pads, the second sensing pads, the second bridge lines and the patterned electrode layer. In other words, the first sensing pads, the second sensing pads, the second bridge lines and the patterned electrode layer are disposed between the first insulating layer and the second insulating layer, and the first bridge lines is disposed between the first insulating layer and the first substrate, but not limited thereto.

Figure 8:
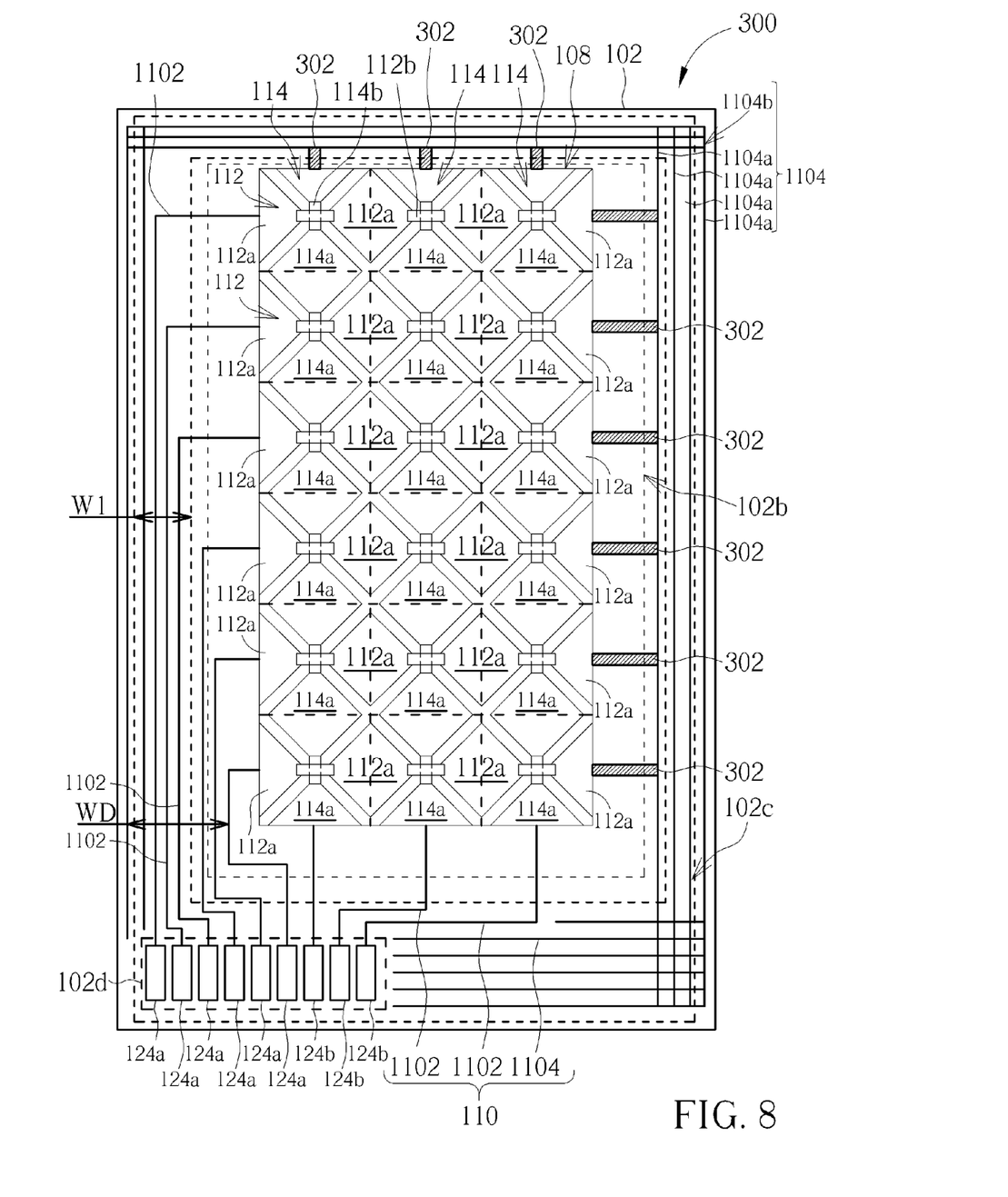
FIG. 8 is a schematic diagram illustrating a top view of a touch sensing display panel according to a third embodiment of the present invention.

The auxiliary electrode of the present invention is used not only to uniform the thickness of the films in the sealant region but also as an electrostatic protection electrode for a touch sensing device. Please refer to FIG. 8. FIG. 8 is a schematic diagram illustrating a top view of a touch sensing display panel according to a third embodiment of the present invention. As shown in FIG. 8, as compared with the first embodiment, the touch sensing display panel 300 in this embodiment may further include a plurality of electrostatic protection devices 302, such as electrostatic discharge tips, a discharge diode or a discharge transistor, but not limited thereto. The electrostatic protection devices 302 are disposed among each of the first sensing strings 112, each of the second sensing strings 114 and the auxiliary electrode 1104 so as to electrically connect the touch sensing device 108 to the auxiliary electrode 1104. The auxiliary electrode 1104 may be electrically connected to the ground, and electrostatic charges generated by the touch sensing device 108 may thus flow to the ground with the auxiliary electrode 1104 so as to provide electrostatic protection and protect the touch sensing device 108 from external signals interferences. It is should be noted that the auxiliary electrode 1104 in this embodiment includes a mesh electrode 1104b so as to reduce the impedance of the auxiliary electrode 1104 effectively and protect the touch sensing device 108 from interferences even more effectively.

Figure 9:
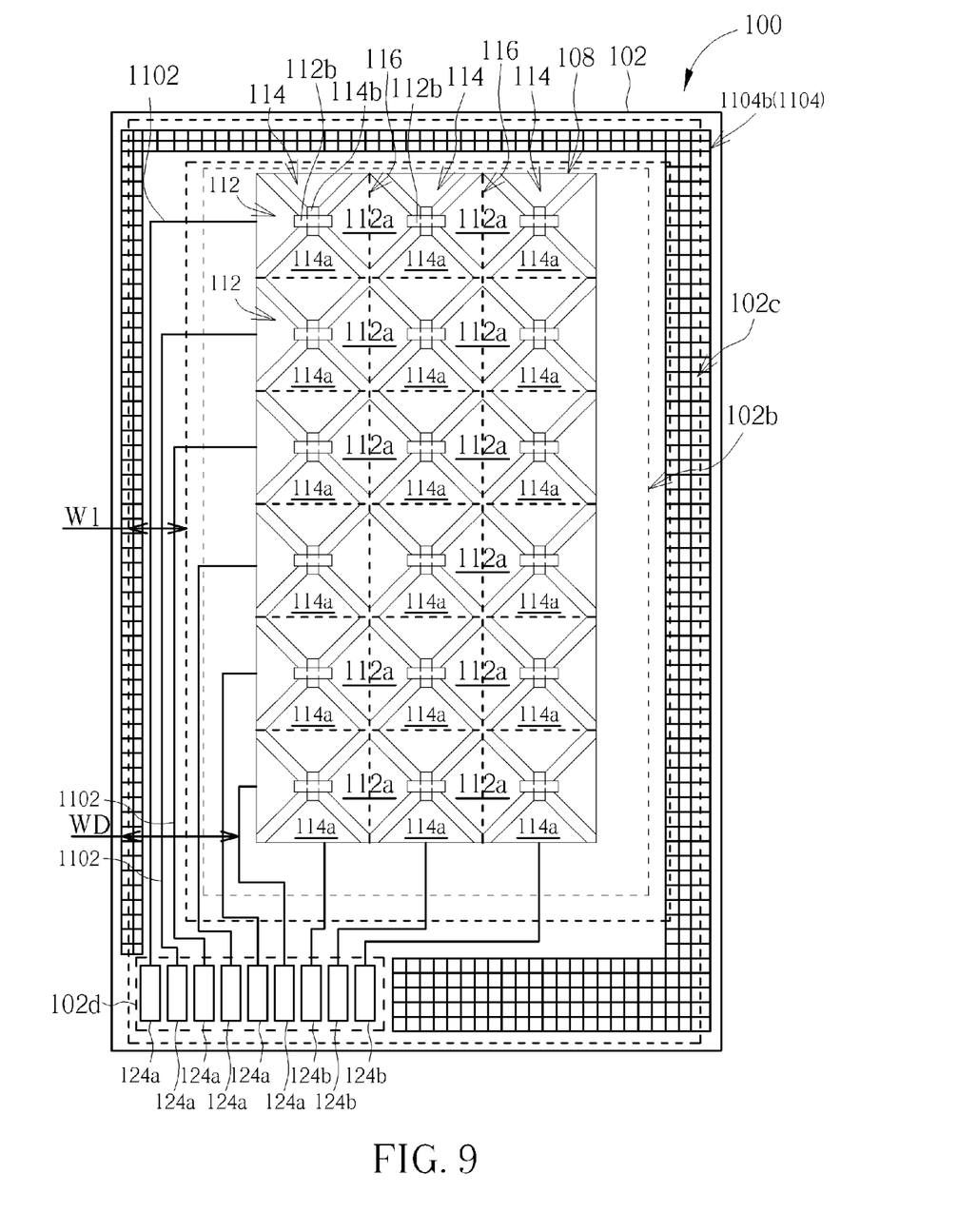
FIG. 9 is a schematic diagram illustrating a top view of a touch sensing display panel according to a fourth embodiment of the present invention.

Please refer to FIG. 9. FIG. 9 is a schematic diagram illustrating a top view of a touch sensing display panel according to a fourth embodiment of the present invention. As shown in FIG. 9, as compared with the first embodiment, the auxiliary electrode 1104 of the touch sensing display panel 400 in this embodiment further includes a mesh electrode 1104b. As compared with the auxiliary electrode lines, since the mesh electrode 1104b has a larger area in the sealant region 102c, the impedance of the auxiliary electrode 1104 can be reduced effectively, protecting the touch sensing device 108 from interferences even more effectively. In other embodiments of the present invention, the auxiliary electrode may include at least two of a mesh electrode, a stripe auxiliary electrode and a patterned planar electrode simultaneously.

In summary, since the auxiliary electrode is disposed on the inner surface of the first substrate in the sealant region without the connecting lines of the touch sensing display panel in the present invention, the gap or spacing at the four sides of the first substrate and of the second substrate is uniform. Therefore, uneven gap of the display medium layer between the first substrate and the second substrate can be avoided, and the spacing between the connection pads overlapping the sealant and the contact pads overlapping the sealant thus remains uniform. Accordingly, contacts between the conductive structures and the connection pads and between the conductive structures and the contact pads are enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A touch sensing display panel, comprising:
a first substrate, having an inner surface, the first substrate having a touch sensing region, and a sealant region surrounding the touch sensing region;
a second substrate, disposed opposite to the first substrate and facing the inner surface of the first substrate;

a touch sensing device, disposed on the inner surface of the first substrate in the touch sensing region;

a patterned electrode layer, disposed on the inner surface of the first substrate in the sealant region, and the patterned electrode layer comprising a plurality of connecting lines and an auxiliary electrode, wherein the connecting lines are electrically connected to the touch sensing device, the auxiliary electrode is not directly electrically connected to the connecting lines and the touch sensing device, and the auxiliary electrode is electrically connected to a ground, wherein a thickness of each of the connecting lines is equal to a thickness of the auxiliary electrode, and the connecting lines and the auxiliary electrode are disposed on a same surface;

an insulating layer, disposed on the inner surface of the first substrate and covering the touch sensing device, the connecting lines, and the auxiliary electrode; and a sealant, disposed between the first substrate and the second substrate in the sealant region, and the sealant being configured to combine the first substrate and the second substrate, wherein the auxiliary electrode and at least one of the connecting lines overlap the sealant to be located between the sealant and the first substrate.

2. The touch sensing display panel according to claim 1, further comprising a display medium layer, disposed between the first substrate and the second substrate, wherein a sealant region surrounds the display medium layer.

3. The touch sensing display panel according to claim 2, wherein the display medium layer comprises a liquid crystal layer, an organic electroluminescent layer, an inorganic electroluminescent layer, an electrophoretic display material layer, an electro-wetting display material layer, a field emission display material layer, or a plasma display material layer.

4. The touch sensing display panel according to claim 1, wherein the touch sensing device comprises a plurality of first sensing strings and a plurality of second sensing strings, and the first sensing strings and the second sensing strings are intersected each other to form a plurality of sensing units arranged in an array.

5. The touch sensing display panel according to claim 4, wherein each of the first sensing strings comprises a plurality of first sensing pads and a plurality of first bridge lines connecting the first sensing pads adjacent to each other, and each of the second sensing strings comprises a plurality of second sensing pads and a plurality of second bridge lines connecting the second sensing pads adjacent to each other.

6. The touch sensing display panel according to claim 5, wherein the first bridge lines and the patterned electrode layer are formed of a same material layer.

7. The touch sensing display panel according to claim 5, wherein the second bridge lines and the patterned electrode layer are formed of a same material layer.

8. The touch sensing display panel according to claim 1, wherein the connecting lines are disposed between the auxiliary electrode and the touch sensing device.

9. The touch sensing display panel according to claim 1, wherein the sealant has a first width along a vertical direction, the connecting lines and the auxiliary electrode have a distribution width along the vertical direction, and the distribution width is greater than or equal to the first width.

10. The touch sensing display panel according to claim 9, wherein the first width is in a range comprised between 250 μm and 2000 μm.

11. The touch sensing display panel according to claim 1, wherein the auxiliary electrode comprises a plurality of auxiliary electrode wires, and each of the auxiliary electrode wires has a second width in a range comprised between 1 μm and 100 μm.

12. The touch sensing display panel according to claim 11, wherein any two of the auxiliary electrode wires adjacent to each other are spaced apart with a distance in a range comprised between 1 μm and 100 μm.

13. The touch sensing display panel according to claim 1, wherein the auxiliary electrode comprises a mesh electrode.

14. The touch sensing display panel according to claim 1, wherein the auxiliary electrode comprises a patterned planar electrode.

15. The touch sensing display panel according to claim 1, wherein the patterned electrode layer overlaps the sealant along the vertical direction, and an overlapping area of the patterned electrode layer and the sealant is substantially in a range comprised between 30% and 99% of an area of the sealant.

16. The touch sensing display panel according to claim 1, further comprising a patterned conductive layer, having a plurality of connection pads, disposed between the insulating layer and the sealant.

17. The touch sensing display panel according to claim 16, wherein the insulating layer has a plurality of through holes, and each of the connection pads of the patterned conductive layer respectively contacts each of the connecting lines through the through holes so as to electrically connect each of the connecting lines.

18. The touch sensing display panel according to claim 17, further comprising a periphery circuit, disposed on the second substrate and facing the first substrate, and a plurality of conductive structures, disposed in the sealant and electrically connecting each of the connection pads to the periphery circuit.

19. The touch sensing display panel according to claim 1, further comprising a plurality of electrostatic protection devices, electrically connecting the touch sensing device to the auxiliary electrode.

* * * * *